US005699492A

United States Patent [19]

Karaki

[11] Patent Number: 5,699,492
[45] Date of Patent: Dec. 16, 1997

[54] BLACK AREA DISCRIMINATION SYSTEM FOR INK JET COLOR PRINTING AND METHOD THEREFOR

[75] Inventor: Nobuo Karaki, Nagano, Japan

[73] Assignee: Seiko Epson Corporation, Tokyo, Japan

[21] Appl. No.: 542,930

[22] Filed: Oct. 13, 1995

[30] Foreign Application Priority Data

Oct. 14, 1994 [JP] Japan ................. 6-249865

[51] Int. Cl.$^6$ ............. G06K 15/00; G03F 3/08; H04N 1/46
[52] U.S. Cl. ............. 395/109; 358/529; 358/538; 347/43; 347/40
[58] Field of Search ............. 395/100, 101, 395/115, 131, 114; 358/529, 518, 502, 505, 520, 500, 538; 347/40, 43, 100, 102, 115; 399/1

[56] References Cited

U.S. PATENT DOCUMENTS

| | | | |
|---|---|---|---|
| 4,682,216 | 7/1987 | Sasaki et al. | 347/43 |
| 5,031,034 | 7/1991 | Shimuzu et al. | 358/529 |
| 5,057,852 | 10/1991 | Formica et al. | 347/43 |
| 5,168,552 | 12/1992 | Vaughn et al. | 395/109 |
| 5,428,377 | 6/1995 | Stoffel et al. | 358/529 |
| 5,475,800 | 12/1995 | Vaughn et al. | 395/109 |
| 5,483,361 | 1/1996 | Shimuzu et al. | 358/529 |
| 5,579,453 | 11/1996 | Lindenfelser et al. | 395/115 |
| 5,596,355 | 1/1997 | Koyama et al. | 347/43 |

FOREIGN PATENT DOCUMENTS

| | | | |
|---|---|---|---|
| 5276373 | 10/1993 | Japan | H04N 1/40 |
| 5330086 | 12/1993 | Japan | B41J 2/21 |
| 647927 | 2/1994 | Japan | B41J 2/21 |

*Primary Examiner*—Dwayne Bost
*Assistant Examiner*—Tracy M. Legree
*Attorney, Agent, or Firm*—Sughrue,Mion,Zinn,Macpeak & Seas, PLLC

[57] ABSTRACT

In a printing system constituted by a host computer and a printer, in an operating system of the host computer, a GDI module receives a drawing command from an application, and converts this drawing command into another drawing command which can be understood by a printer device driver. In the device driver, first, a preprocessor receivers the drawing command from the GDI module, and detects black areas contacting with color areas in figures or characters in a page on the basis of this received drawing command. Next, the preprocessor revises the drawing command so that the color of black areas contacting with color areas is changed from pure black to composite black. After this, the revised drawing command is sent to a rasterizer and a half toning portion sequentially, and converted into bit map data which can be understood by the printer. This bit map data is supplied to the printer through a print manager.

9 Claims, 6 Drawing Sheets

BLACK AREA DISCRIMINATION SYSTEM FOR INK JET COLOR PRINTING AND METHOD THEREFOR

BACKGROUND OF THE INVENTION

1. Field of the Invention

The present invention relates to printing of black areas in an ink jet color printing system using color ink and black ink, and particularly relates to a system of black area discrimination for appropriately using either composite black of a color ink mixture or pure black of only black ink.

2. Related Art

Ink of four colors, that is, ink of three colors of cyan, magenta and yellow (hereinafter abbreviated to "C", "M" and "Y" respectively) and ink of pure black are generally used in an ink jet color printing system. Ink with a property to penetrate paper so quickly as to prevent color mixing (hereinafter referred as "super-penetration ink") is used as color ink in order to realize color printing at a high speed and at a low running cost. On the other hand, ink with a property so as not to penetrate paper much to thereby keep its shape as it is upon reaching the paper (hereinafter referred as "slow-penetration ink") is used as pure black ink because of its usage to print letters or signs with sharp outline shapes.

As well known, to print black, there are a method in which pure black ink is used, and a method in which a mixture of ink of three colors of C, M and Y is used. Black in the latter case is called composite black.

In the case where a black area in an image picture is printed, there is known a printing method in which printing is performed with composite black when this black area contacts with a color area, and printing is performed with pure black when the black area does not contact with any color area. This method solves a so-called color mixing problem caused by contact of super-penetration ink (color ink) with slow-penetration ink (pure black ink) on paper. In connection with this printing method, there is also known a method in which pure black is used merely in a black area at a predetermined distance or more from any black area printed with composite black, in order to make it hard to recognize a delicate difference of hue between pure black and composite black by human eyes. Further, there is also known a method in which black is printed by mixing mixture dots of C and M and dots of pure black. This mixture black is also called composite black.

When composite black and pure black are alternatively used as mentioned above, it is necessary to carry out a processing to grasp the positional relationship between respective black areas and color areas in an image to thereby judge which ink should be used in the respective black areas (hereinafter, this processing will be referred to as "area discrimination processing").

What is disclosed in Japanese Patent Unexamined Publication No. Hei-5-276373 is known as one of the conventional techniques relating to this area discrimination processing. In this known method, for example, in an ordinary system constituted by a host computer and a terminal printer, print data made up by an application in the host computer is first converted into bit map data suitable to the printer, and thereafter the above-mentioned area discrimination processing is performed upon this bit map data.

It is a problem belonging to this well-known area discrimination method that processing time becomes very long. One of the reasons for this long processing time is that a data quantity of bit map data is too huge. For example, megabytes of data are required to define an image of 10×10 inches and 300 dpi (dots per inch) by a bit map.

Another reason why processing time becomes long is that in order to carry out area discrimination on a bit map, the contact relationship between a black area and color area must be checked along an outline of each of all the areas pixel by pixel thoroughly. For example, assume that such a check is started from the left end of a black line which is extended right and left. Then, if this line contacts with a color area only at the right end, or if the line does not contact with any color area, a discrimination result cannot be obtained before the whole area of the line from the left end to the right end has been checked.

SUMMARY OF THE INVENTION

It is therefore an object of the present invention to finish area discrimination as soon as possible in a system in which areas of an image are discriminated to appropriately alternatively use composite black and pure black in an ink jet printing system.

It is another object of the present invention to obtain, in a short time, a color printed image, where there is no sense of incompatibility to human eyes.

In order to solve the foregoing problems, the present invention provides a black area discrimination system for ink jet color printing using a black ink and at least one color ink, comprising: attribute acquisition means supplied with a description in which a series of drawing procedures for drawing a picture to be printed are described in a high level language, for acquiring attributes about positions, sizes and colors of individual areas drawn in accordance with said respective drawing procedures; intersection point detection means for detecting black areas including intersection points with color areas on the basis of said acquired attributes of said individual areas; and discrimination information generation means for generating information for discriminating said black areas detected by said intersection point detection means from black areas not detected thereby.

According to the system of the present invention, for example, in an ordinary system constituted by a host computer and a printer, before print data made up by an application in the host computer is converted into final bit map data, the processing of area discrimination is performed on the basis of a description in a high level language in the stage where this print data is expressed in the form of such a description. That is, print data made up by any application has a construction in which a series of drawing procedures for drawing a page to be printed are described by use of a predetermined high level language which is an interface of an operating system. In the system of the present invention, black areas included in the page to be printed are discriminated in the stage of a higher level description than a bit map, such as a description of drawing procedures written in the highest level language made up by the application, a description written in an intermediate level language converted from the description of the drawing procedures by the operating system, or the like.

Therefore, the quantity of data to be processed is far smaller than that in the conventional case where area discrimination is performed on the basis of a bit map. In addition, since attributes, such as positions, sizes, colors, and so on, of areas of a figure or a text to be drawn are defined as numerical information in such a high level language, contact/noncontact between the areas can be judged immediately through arithmetic operation of the numerical information. As a result, the processing can be finished in a very short time.

In a preferred embodiment, not only black areas contacting with color areas but also black areas disposed within a predetermined short distance from the black areas are discriminated. The description written in the high level language is rewritten on the basis of the result of this area discrimination. That is, the description in which a series of drawing procedures are written in the high level language is revised so that black areas contacting with color areas and black areas disposed within a predetermined short distance from the black areas are changed in color from pure black to composite black. The conversion into a bit map is performed on the basis of this revised description. Therefore, the same conventional module used for conversion from a high level language into a bit map can be used also in this case.

DETAILED DESCRIPTION OF THE PREFERRED EMBODIMENTS

An embodiment of the present invention will be described below in detail with reference to the drawings.

Figure 1:
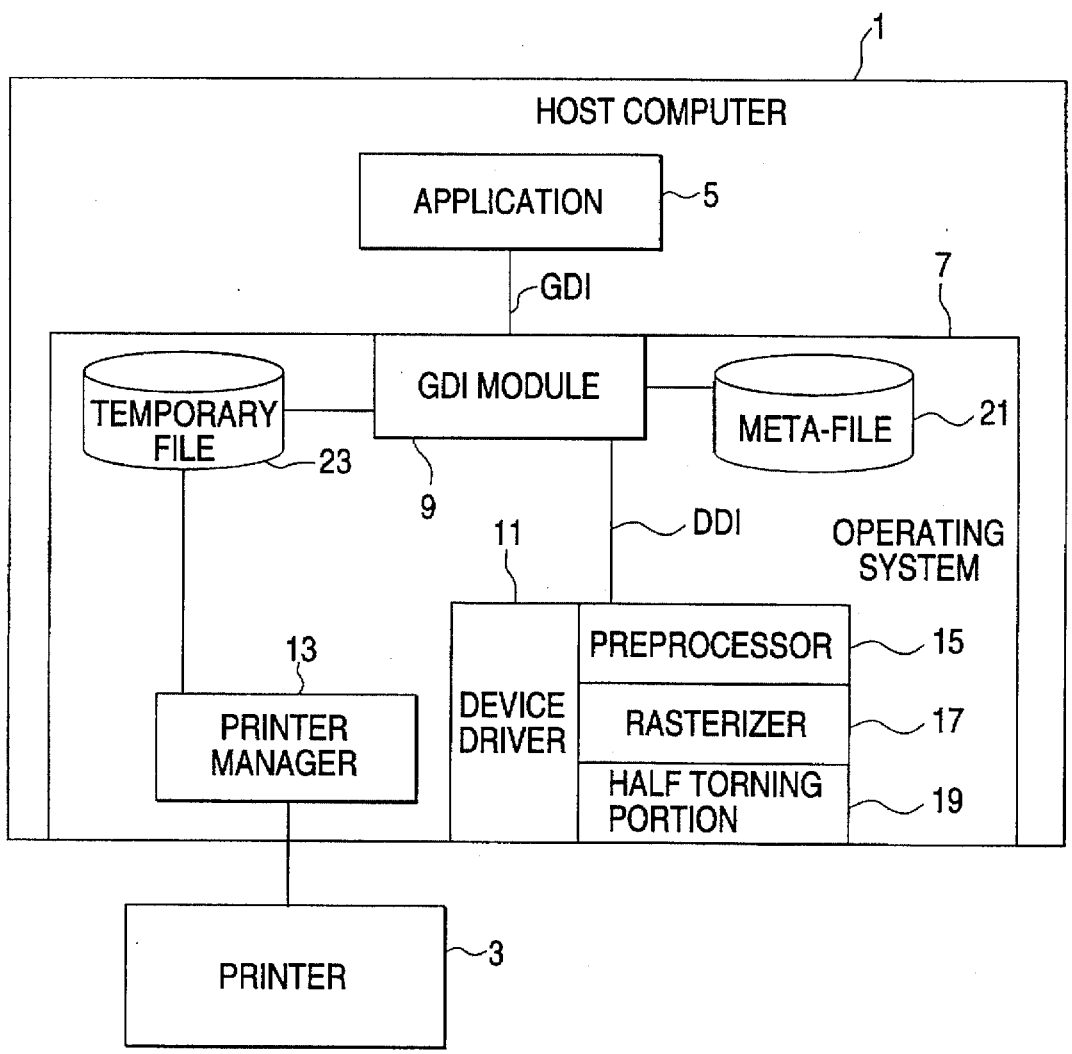
FIG. 1 shows a block diagram illustrating the configuration of an embodiment of an area discrimination system according to the present invention.

FIG. 1 shows a configuration of an embodiment of an area discrimination system according to the present invention.

In FIG. 1, the reference numeral 1 represents a host computer, and 3 represents an ink jet terminal printer connected to the host computer 1. The host computer 1 carries an application program (hereinafter simply referred to as "application") 5 and an operating system 7.

In this embodiment, MS-Windows by Microsoft Corp. is used as the operating system 7. This operating system 7 includes a graphic device interface (hereinafter abbreviated to "GDI") module 9, a printer device driver (hereinafter abbreviated to "device driver") 11 suitable to the printer 3, and a print manager 13.

The GDI module 9 supplies the application 5 with a common graphic device interface (GDI) which is prescribed for the convenience of application development and which does not depends on output devices such as a printer, a display, and so on.

The GDI module 9 also supplies the device driver 11 with a device driver interface (hereinafter abbreviated to "DDI") which is prescribed for the convenience of device drive development. In accordance with this DDI, the device driver 11 is designed for exclusive use for its associated device (the printer 3 in this case). The GDI module 9 serves as a converter which converts a function call of the GDI written in a device-independent form into a function call of the DDI written in a device-dependent form.

The device driver 11 converts a drawing function given through the GDI module 9 by the application 5, into an output form which can be recognized by the printer 3. For example, when the output form to the printer 3 is a bit map, the device driver 11 has a rasterizer 17 for making up data for every pixel on the basis of the drawing function, and a half toning portion 19 for converting the multi-tone data for every pixel from the rasterizer 17 into a binary dot pattern for half-tone expression, as illustrated in the drawing.

The configuration of the device driver 11 varies depending on its associated device. For example, when the device driver 11 makes up a printer output written in a high level page description language such as a postscript, the device driver 11 is provided with a processing portion (not shown) for translating drawing functions into the page description language. When the device driver 11 is associated with a printer such as a thermally subliming printer having a gradation expressing function, the half toning portion 19 is not required.

In either configuration, one of features of the device driver 11 is that the device driver 11 has a preprocessor 15. That is, this preprocessor 15 carried out an area discrimination processing relating to black areas on the basis of the drawing function prior to the conversion processing from the drawing function into the printer output form by means of the rasterizer 17, the half toning portion 19, or the like, so that the original drawing function is rewritten on the basis of the result of the above processing. That is, the preprocessor 15 does not perform area discrimination on a bit map unlike in the conventional case but it performs area discrimination in the stage of DDI which is a high level language.

The print manager 13 transfers a printer output file made up by the device driver 11 to the printer 3.

Figure 2:
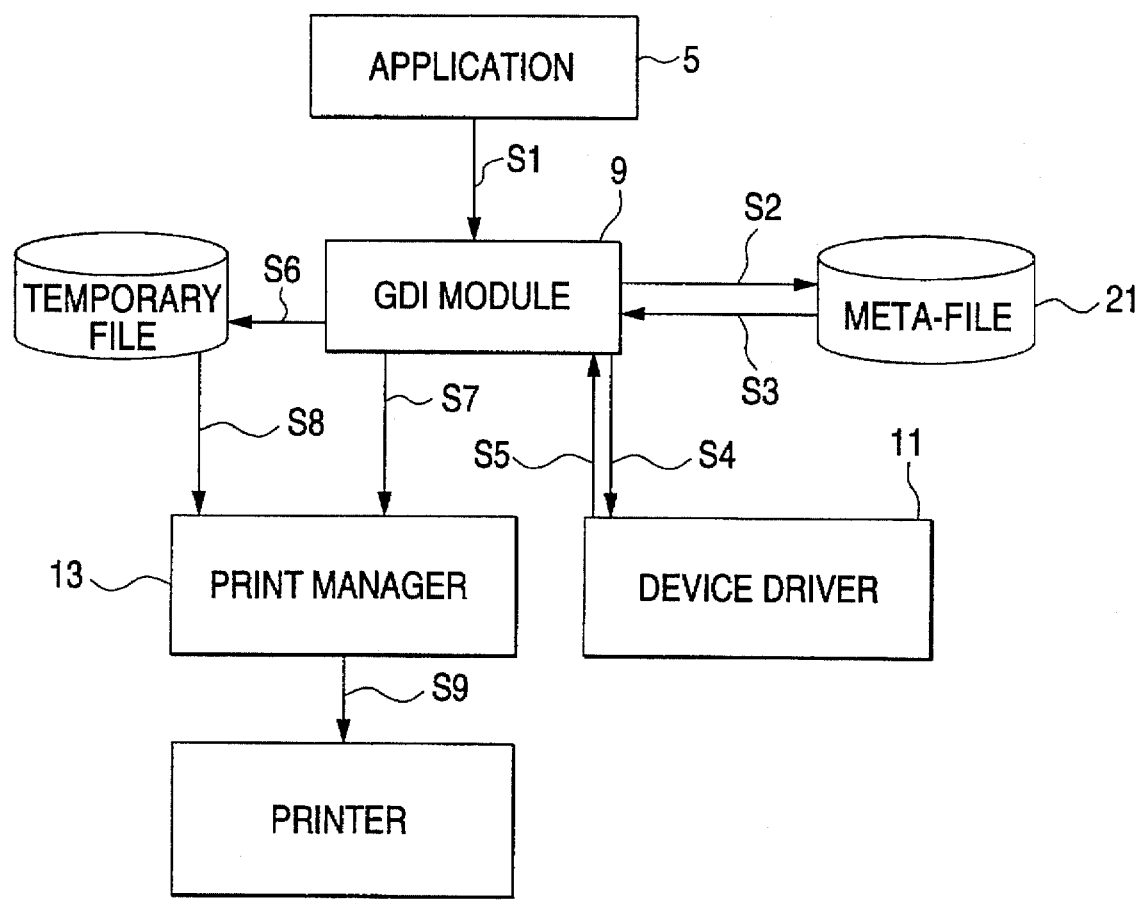
FIG. 2 shows a block diagram for explaining the whole flow of information at the time of printing in the same embodiment.

FIG. 2 shows a total flow of information when printing is performed in the above-mentioned configuration.

In printing, the application 5 supplies the GDI module 9 with a function call (hereinafter referred to as "GDI call") for a drawing function of GDI (hereinafter referred to as "GDI function")(S1).

As for the GDI function, for example, there are provided a variety of drawing functions such as a function for drawing a specific figure such as an ellipse, a rectangle or the like, a function for outputting a designated text, a function for making up a bit map, and so on. The GDI call has a construction in which some predetermined arguments are added to the designation of these GDI functions. The coordinates, size, and so on, of a drawn object (hereinafter referred to as "primitive") such as a figure, a text, or the like, in a page are specified on the basis of the arguments. In addition, a GDI function to designate or change the attributes such as the coordinates, size, color, and so on, of the primitive is also provided.

The GDI module 9 stores these GDI calls in a meta-file 21 (S2). This meta-file 21 is made up in a desired storage such as a hard disk, or the like.

When the application 5 finishes GDI calls for drawing one page, the GDI module 9 calls DDI drawing functions (hereinafter abbreviated to "DDI function") corresponding to the drawing functions of the meta-file 21 one by one. That is, function calls of DDI functions (hereinafter abbreviated to "DDI call") corresponding to the GDI functions and corresponding to the drawing faculty of a device are sent to the device driver 11 (S3 and S4).

The construction of each DDI call is basically constituted by the designation of a DDI function and some arguments in the same manner as that of each GDI call, and the arguments specify coordinates or size of a primitive in a page. Further, there is provided a DDI function to designate or change attributes such as coordinates, size, color, and so on, of the primitive.

The device driver 11 converts a called DDI function into an output form (a bit map in this embodiment) which can be recognized by the printer 3, and supplies this printer output to the GDI module 9 (S5). The GDI module 9 stores this printer output in a temporary file 23 (S6).

When the printer output of the whole of the page has been written in the temporary file 23, the GDI module 9 informs the print manager 13 that a new print job is ready (S7). The print manager 13 reads the temporary file 23, and transfers the temporary file 23 to the printer 3. When the output to the printer 3 is completed, the print manager 13 deletes the temporary file 23 which has stored the output content.

Figure 3:
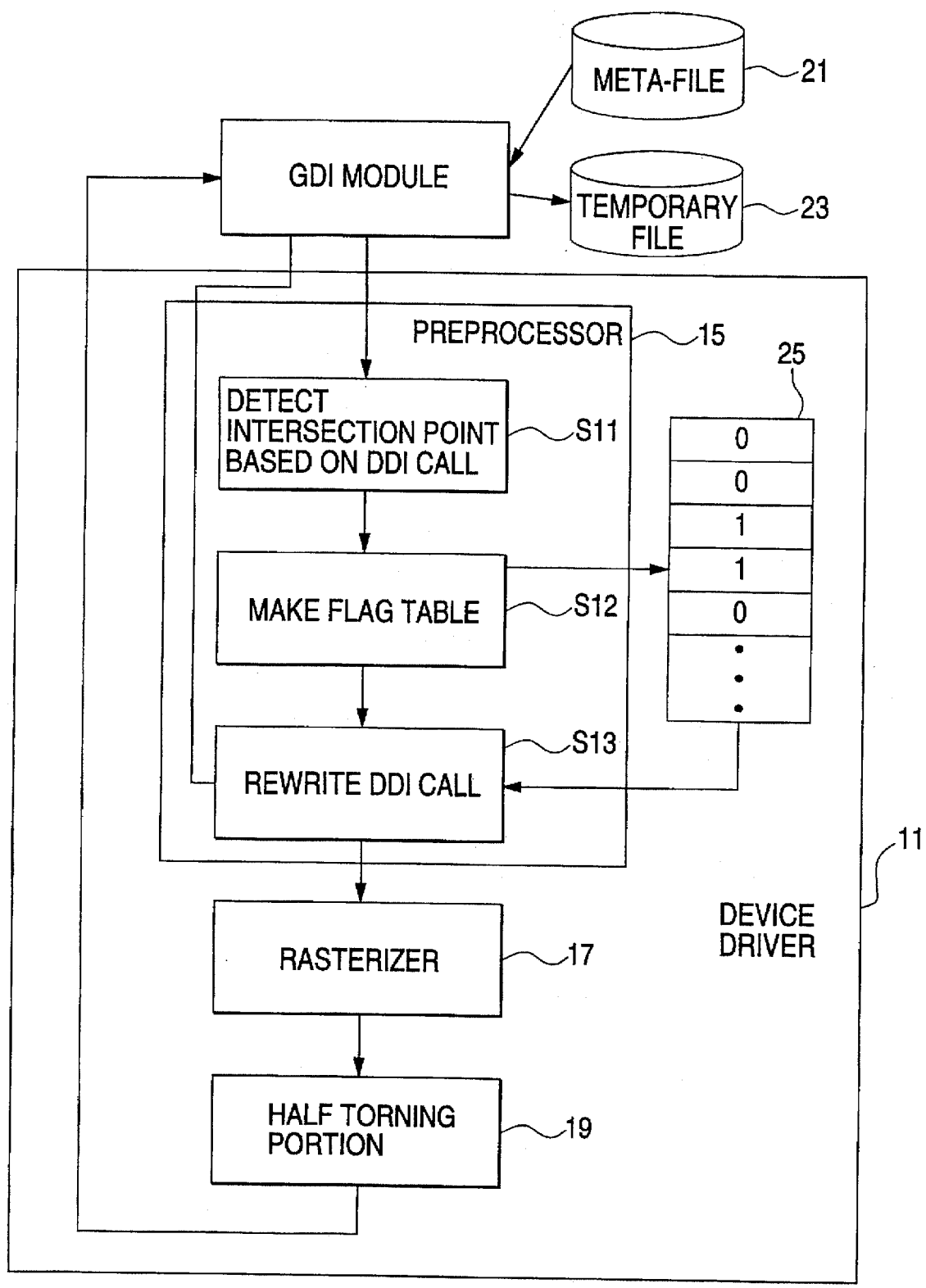
FIG. 3 shows a block diagram for explaining an operation of a device driver in the same embodiment.

FIG. 3 shows the operation of the device driver 11 in the above whole operation more specifically. As shown FIG. 3, first, the preprocessor 15 receives one page of DDI calls from the GDI module 9, grasps the coordinates, sizes and colors of primitives to be drawn by called drawing functions, and detects intersection points (contact points) between a black primitive and a color primitive (S11). The preprocessor 15 makes up a flag table 25 showing the result of the intersection point detection (S12). The flag table 25 is constituted by flags arranged correspondingly to one page of the DDI calls one by one, and in the flag table 25, only flags corresponding to black primitives having intersection points with color primitives (that is, contacting therewith) are set to "1" while the other flags are set to "0".

Upon finishing of making up the flag table 25, the preprocessor 15 makes the GDI module 9 send the preprocessor 15 the DDI calls of the meta-file 21 again, and rewrites the DDI calls with reference to the flag table 25 so as to replace the color of the black primitives corresponding to the flags set to "1", which is pure black, by composite black (S13). The content of this function of color replacement is such that, for example, the initial color which is designated as "0,0,0" in 256 gradation color values (printing is made in pure black in this case) is changed into the designation including color components uniformly like "4,4,4" (printing is made in composite black in this case).

After the DDI calls are rewritten by such color replacement, the DDI calls are sent to the rasterizer 17 and converted into bit map data. This bit map data is sent to the half toning portion 19 and converted into a binary dot pattern for every pixel so as to be changed into a final printer output form. This converted printer output is sent to the GDI module 9 and written in the temporary file 23, and thereafter transferred to the printer. As a result, the black primitives which have not been subjected to color replacement are printed in pure black. The black primitives which have been subjected to color replacement are printed in composite black.

Figure 4:
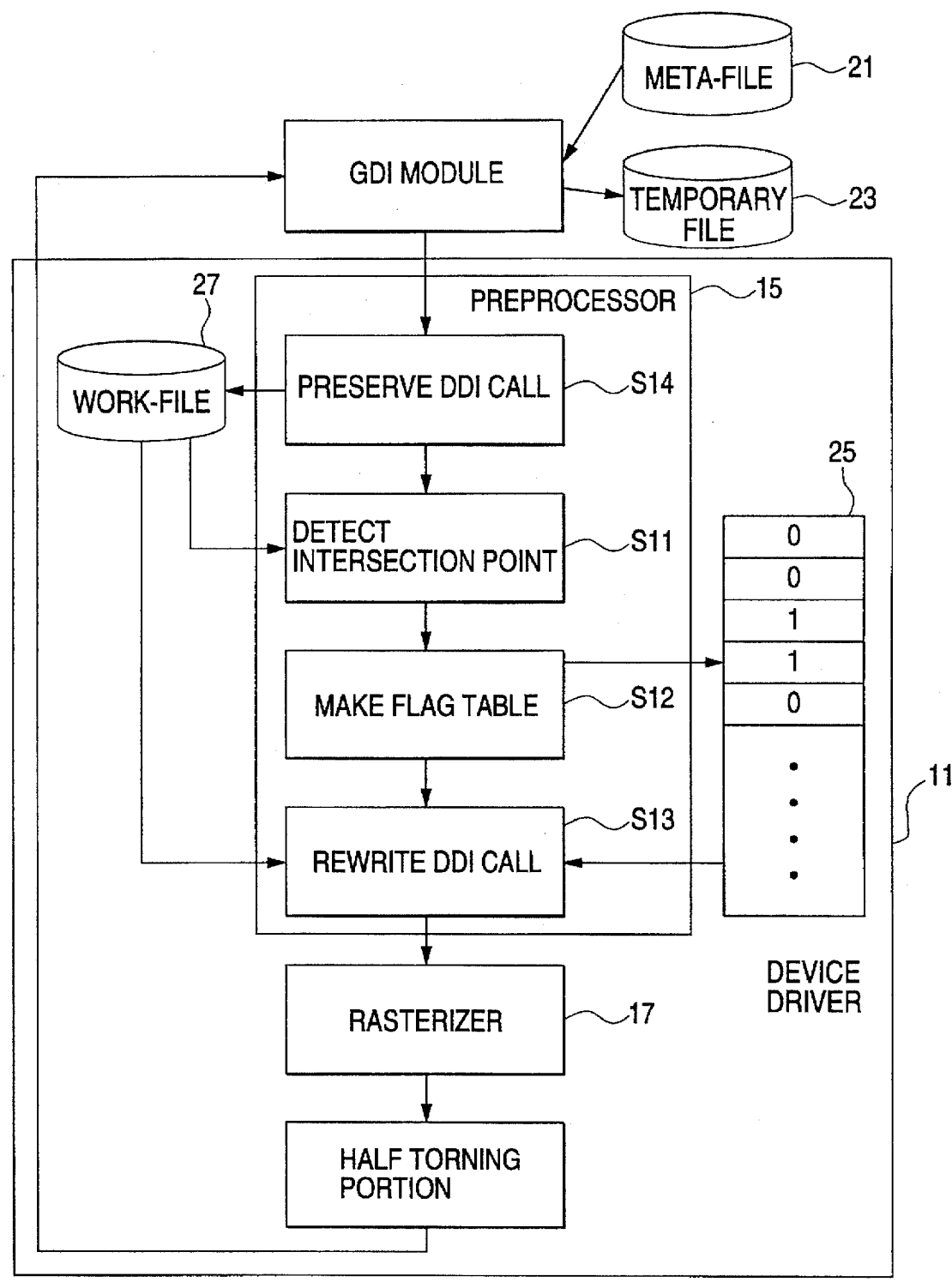
FIG. 4 shows a block diagram for explaining another operation of the device driver in the same embodiment.

FIG. 4 shows another example of the operation of the aforementioned preprocessor 15. That is, while DDI calls are sent to the preprocessor 15 by the GDI module 9 twice in the above operation, in the operation shown in FIG. 4, DDI calls received in the first place are preserved in a work file 27 (S14), the above-mentioned intersection point detection is performed upon the DDI calls stored in this work file 27 (S11), or rewriting of the DDI calls of color replacement is performed thereon (S13), so that the reception from the GDI module 9 is performed only once.

Figure 5:
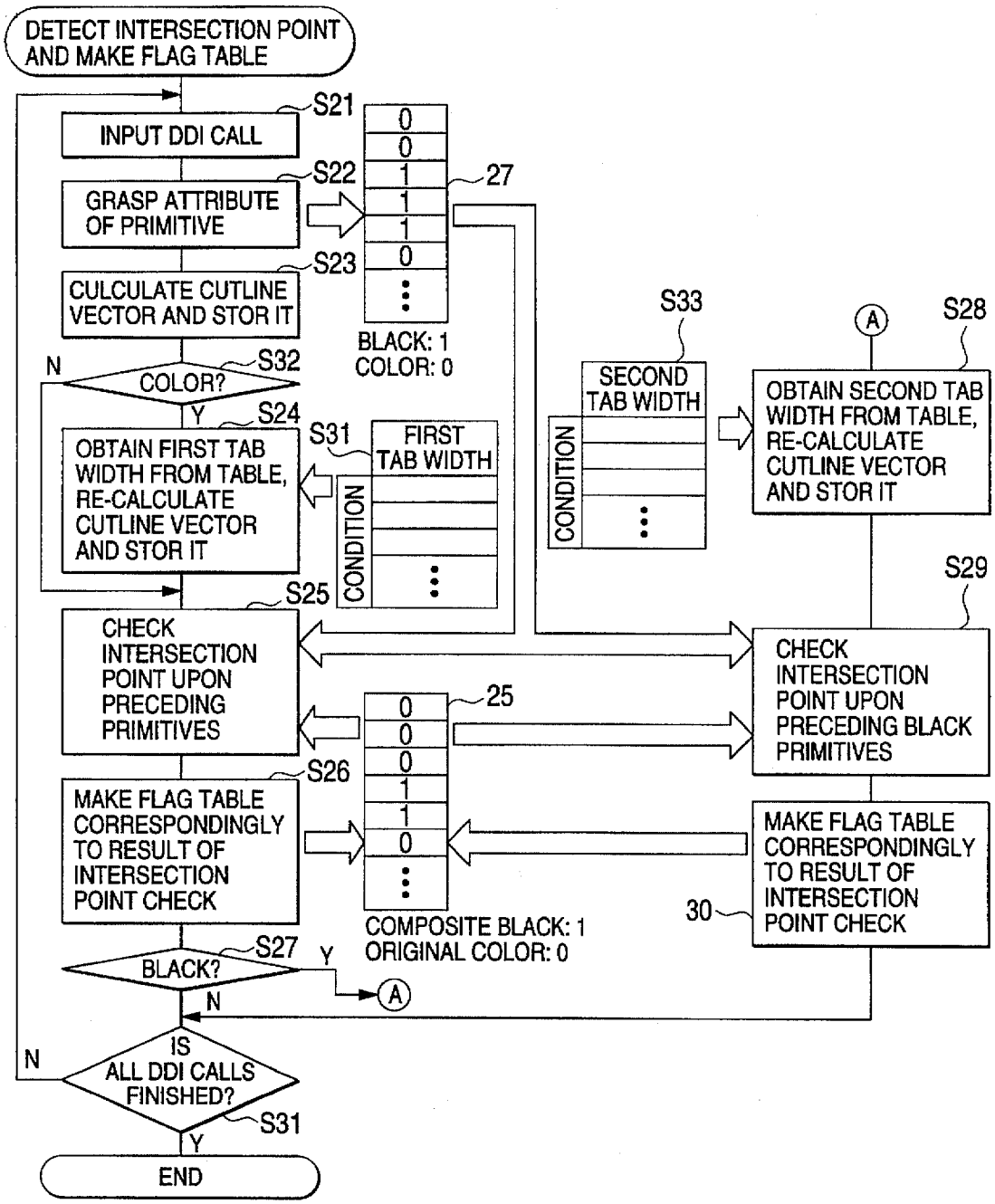
FIG. 5 shows a flow chart showing an intersection point detection processing of a preprocessor in the same embodiment.

FIG. 5 shows more in detail the intersection point detection and the processing of making up a flag table (S11 and S12) shown in FIG. 3 and 4.

First, DDI calls are inputted (S21), and attributes such as coordinates, sizes, colors, and so on, of primitives to be drawn are grasped and stored (S22). These attributes can be grasped on the basis of arguments of the DDI calls or preceding DDI calls having contents of designation or modification of the attributes. A flag table 27 where flags corresponding to color primitives are set to "0" and flags corresponding to black primitives are set to "1" are made up on the basis of the grasped colors.

Next, checking is made in the procedures of steps S23 to S26 as to whether black primitives and color primitives contact with each other or not.

That is, first, vectors expressing the outline of a target primitive are obtained from the coordinates and size of the primitive by operations, and stored (S23). Next, only in the case where the primitive is color, a tab of a predetermined width is added to the outer circumference of the outline, and the outline vectors are calculated again so that the stored values of the outline vectors are renewed (S32, S24). Taking into consideration the size of dots on paper and a position gap of a head of the printer 3, the width of this tab is made to correspond to a distance (for example, three dots) necessary and sufficient for dots not to contact with each other. Since the optimum value of this tab width varies in accordance with set conditions such as the type of paper, the type of ink, the resolution, and so on, even in a printer of the same type, the optimum value is read out from a previously provided table 31 of correspondence between the set conditions and the optimum value of the tab width.

Next, on the basis of the outline vectors of the primitive (to which a tab has been added), and the outline vectors of primitives formed by preceding DDI calls (to which a tab has been added), checking is made from vector operations as to whether the target primitive has an intersection point with (or contacts with) any of the preceding primitives (S25). Here, the intersection point check is performed only upon the preceding color primitives (the corresponding flags in the table 27 are "0") in the case Where the target primitive is black (the corresponding flag in the table 27 is "1"), and on the contrary, the intersection point check is performed only upon the preceding black primitives (the corresponding flags in the flag table 25 which will be described later are "0") in which no intersection point with any color primitive has been detected yet, in the case where the target primitive is color. This intersection point check is completed in a very short time because it can be performed by the operations of outline vectors.

Next, a new flag table 25 is made up correspondingly to the result of the above intersection point check (S26). That is, in this flag table 25, in the case where a target primitive is black, the flag of the primitive is set to "1" if the target primitive has an intersection point with a color primitive, while it is set to "0" if the target primitive has no intersection point with any color primitive. On the other hand, in the case where the target primitive is color, the flag of the target primitive is set to "0", and the flags of preceding black primitives having intersection points with the target color primitive are changed from "0" to "1". Consequently, in the flag table 25, the flags of black primitives contacting with color primitives are set to "1", and the flags of the other primitives are set to "0".

Next, in the procedures of steps S27 to S30, processing is performed so as to detect, of black primitives having no contact with any color primitive, that which is near black primitives contacting with color primitives. Black primitives having no contact with any color primitive are normally printed in pure black as will be described later, and black primitives contacting with color primitives are printed in composite black. However, when the distance between both the black primitives having no contact and having contacts is very small, the difference of tone between pure black and composite black becomes conspicuous. Therefore, the above-mentioned processing is performed to print also such black primitives having no contact with any color primitive in composite black exceptionally.

First, a flag in the table 27 corresponding to a target primitive is checked (S27), and if the flag is "1" (that is, black), a second tab width is added to the outer circumference of the outline vectors of the target primitive, and the outline vectors are calculated again and stored (S28). The second tab width herein corresponds to the spaced distance (for example, about 1/10 inch) between composite black and pure black so that the difference of tone between both the composite black and pure black cannot be recognized by human eyes (for example, the tab width is 1/20 inch when the spaced distance is 1/10 inch). This tab width is also read from a corresponding table 33 prepared in advance.

Next, intersection points between outline vectors (to which the tab width has been added) of the target black primitive and the other black primitives are checked (S29). In this case, when the target primitive does not contact with any color primitive (the corresponding flag in the flag table 25 is "0"), of preceding black primitives, the intersection point check is performed only on black primitives contacting with color primitives or detected being near such black primitives (the corresponding flags in the flag table are "1"). On the other hand, when the target primitive contacts with color primitives (the corresponding flag in the flag table is "1"), the intersection point check is performed only on preceding black primitives the corresponding flags of which in the flag table 25 are "0" contrary to the above case.

Next, the flag table 25 is rewritten on the basis of the result of this intersection point check (S30). That is, in the case where the target black primitive does not contact with any color primitive, the flag corresponding to the target primitive is changed from "0" to "1" if an intersection point is found in the check of the step S29, and rewriting is not performed if no intersection point is located. In the case where the target black primitive contacts with color primitives, flags corresponding to the other preceding black primitives having intersection points with the target primitive is changed from "0" to "1" if an intersection point is found in the check of the step S29, and rewriting is not performed if no intersection point is located. Consequently, in the flag table 25, flags of black primitives contacting with color primitives or black primitives disposed near such black primitives are set to "1", and flags of the other primitives are set to "0". The flag "1" herein designates a black primitive to be printed in composite black, and the flag "0" designates a primitive to be printed in original color (pure black in the case of a black primitive) according to a drawing command given by the application.

The above processing is repeated upon all the DDI calls of the page (S31). Consequently, the flag table 25 which shows whether each primitive should be printed in composite black or original color is completed.

Since the above intersection point detection processing (that is, area discrimination processing) is performed on DDI calls which are written in a high level language, the quantity of data to be processed is far smaller than that in conventional processing performed on a bit map, and the existence of contact can be found by vector operations immediately, so that the processing is finished in a very short time.

Figure 6:
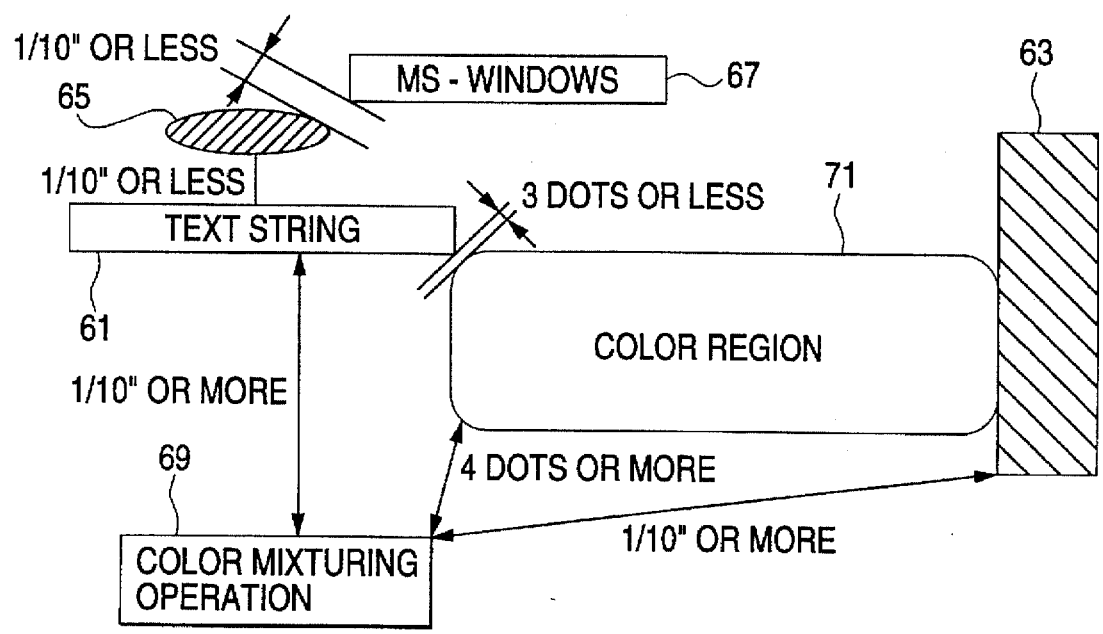
FIG. 6 shows a diagram illustrating an embodiment of a printed image according to the same embodiment.

FIG. 6 shows an example of an image printed in the embodiment which has been described. In FIG. 6, an area 71 is a color primitive. Areas 61, 63, 65 and 67 are black primitives printed in composite black. The areas 61 and 63 contact with the color primitive of the area 71 (or are disposed within a distance of three dots), and the areas 65 and 67 are disposed within 1/10 inch from such black primitives (including the case where they are combined in chain). An area 69 is a black primitive printed in pure black, and this does not contact with any color primitive (or is disposed at a distance of four dots or more), and is disposed at a distance of 1/10 inch or more from the composite black primitives 61 to 67.

In such a printed image, there is no color mixing problem between super-penetration ink and slow-penetration ink, and the difference of tone between pure black and composite black does not cause a problem. In this embodiment, discrimination of black areas for printing such an image can be performed at a higher speed than the conventional one.

There is a case where, for example, a bit image area captured by a scanner, or the like, is included in a series of drawing procedures given by an application. In such a case, the above-mentioned area discrimination method cannot be adopted because the inside of the bit image area is not written in a high level language.

Such a problem is therefore solved in the present invention in such a manner that means for performing a bit image area color attribute changing processing inquires all the color attributes in the bit image area, and all attributes of pure black are changed to values designating composite black. Consequently, it becomes unnecessary to check the relationship of contact between black areas and color areas thoroughly pixel by pixel along the outline of each of all the areas as in a conventional system, so that the object to obtain a printed picture having no sense of incompatibility with human eyes in a short time can be attained. Such means for performing color attribute changing processing in a bit image area may be put in the above-mentioned preprocessor, or be put in another position in the device driver.

There is not only a case where ink of three colors, that is, C, M and Y, are mixed so as to be used as composite black but also a case where pure black ink is mixed with ink of two colors, that is, C and M so as to be used as composite black. In the present invention, the method of realizing composite black is not limited.

Although recently there is a printer having a GDI module itself, the present invention can be applied to this case without any problem if GDI functions thereof are written in a high level language.

Although one embodiment of the present invention has been described above, the present invention can be applied to various other aspects without departing from the spirit and scope thereof.

As has been described above, according to the present invention, image area discrimination for deciding which one of composite black and pure black should be used can be performed in a short time in an ink jet printing system.

In addition, a printed image having no sense of incompatibility with human eyes can be obtained thereby.

What is claimed is:

1. A black area discrimination system for ink jet color printing using a black ink and at least one color ink, comprising:

attribute acquisition means supplied with a description in which a series of drawing procedures for drawing a picture to be printed are described in a high level language, for acquiring attributes about positions, sizes and colors of individual areas drawn in accordance with said respective drawing procedures, said description being a higher level of description than a bit map description;

intersection point detection means for detecting black areas including intersection points with color areas on the basis of said acquired attributes of said individual areas; and discrimination information generation means for generating information for discriminating said black areas detected by said intersection point detection means from black areas not detected thereby.

2. A black area discrimination system for ink jet color printing according to claim 1, wherein said discrimination information generation means makes correction on said description of said series of drawing procedures so as to set the color of said detected black areas detected by said intersection point detection means to composite black as said information for discriminating.

3. A black area discrimination system for ink jet color printing according to claim 2, wherein said black area discrimination system further comprises a bit image area color attribute changing means for changing data expressing pure black, of color attribute data included in a bit image area, into data expressing composite black, on the basis of said acquired attributes of individual areas.

4. A black area discrimination system for ink jet color printing according to claim 1, wherein said black area discrimination system further comprises a neighbor area detection means for detecting other black areas which are disposed within a predetermined neighbor distance from said black areas detected by said intersection point detection means; and wherein said discrimination information generation means generates information for discriminating said black areas detected by either one of said intersection point detection means and said neighbor area detection means from black areas not detected thereby.

5. A black area discrimination system for ink jet color printing according to claim 4, wherein said discrimination information generation means makes correction on said description of said series of drawing procedures so as to set the color of said detected black areas detected by said intersection point detection means to composite black as said information for discriminating.

6. A black area discrimination system for ink jet color printing according to claim 5, wherein said black area discrimination system further comprises a bit image area color attribute changing means for changing data expressing pure black, of color attribute data included in a bit image area, into data expressing composite black, on the basis of said acquired attributes of individual areas.

7. A black area discrimination system for ink jet color printing according to any one of claims 1 to 6, wherein said black area discrimination system further comprises means for making up bit map data in which said detected black areas are expressed as composite black and said black areas not detected are expressed as pure black, in response to said description of said series of drawing procedures and said discriminating information.

8. A black area discriminating method for ink jet color printing using a black ink and at least one color ink comprising:

providing a description in which a series of drawing procedures for drawing a picture to be printed are described in a high level language, the description being a higher level of description than a bit map description;

acquiring an attribute about positions, sizes and colors of areas drawn in accordance with said respective drawing procedures;

detecting black areas including intersection points with color areas on the basis of said acquired attribute of said respective areas; and generating information for discriminating said black areas detected by said intersection point detection step from other black areas.

9. A black area discrimination method for ink jet color printing according to claim 8, wherein said black area discrimination method further comprises a step of detecting other black areas which are within a predetermined neighbor distance from said black areas detected by said intersection point detection step; and wherein information for discriminating said detected black areas detected by said intersection point detection step or said neighbor areas detection step from black area not detected thereby is generated in said discrimination information generation step.

* * * * *